Figure 1:
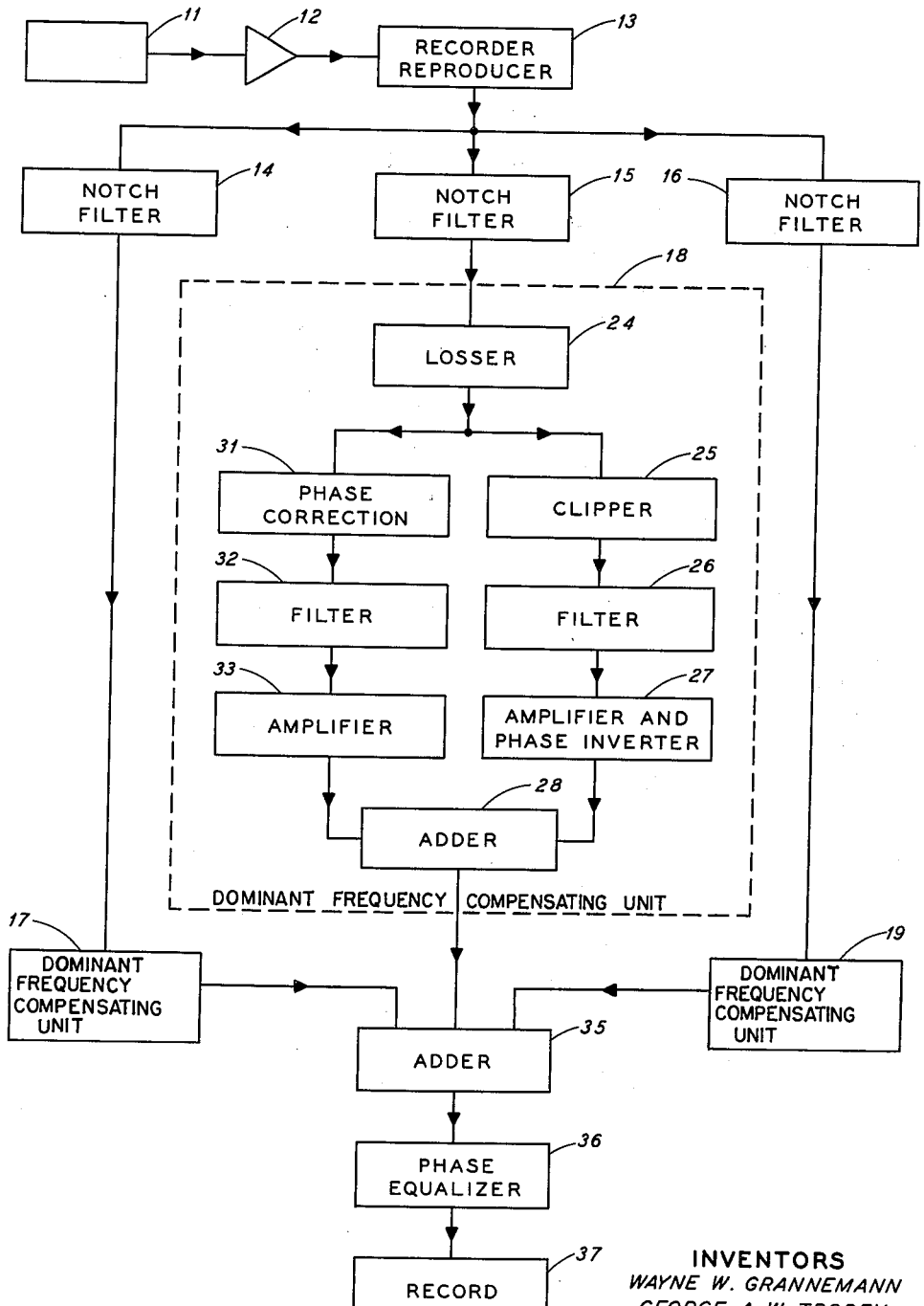

United States Patent Office 2,979,692
Patented Apr. 11, 1961

2,979,692

ELIMINATION OF MULTIPLE FREQUENCY COMPONENTS IN SEISMIC RECORDS

Wayne W. Grannemann, Albuquerque, N. Mex., and George A. W. Trorey, Whittier, Calif., assignors to California Research Corporation, San Francisco, Calif., a corporation of Delaware Filed Dec. 16, 1955, Ser. No. 553,625

11 Claims. (Cl. 340—15)

This invention relates in general to seismic prospecting and relates more specifically to methods and apparatus for analyzing the data obtained in such prospecting to extract the maximum amount of information.

In the art of seismic prospecting, seismic waves artificially generated in the earth are utilized to actuate a plurality of seismic wave detectors which are responsive to reflections and refractions of the waves through subsurface strata to produce electrical output traces varying in sympathy with the received waves. Ideally, such traces, when plotted as a function of time, contain peaks or signal portions indicating receipt of energy reflected from subsurface interfaces, and these signal portions are separated by quiet, almost noise-free intervals. However, in practice a great deal of extraneous energy or noise is received by the detectors simultaneously with the desired reflected energy of interest, thus rendering recognition of the reflected energy difficult or impossible.

One of the most troublesome forms of extraneous energy is that encountered in marine seismic prospecting in which the layer of water in which the seismic wave detectors are located is believed to act as a form of wave guide for seismic energy. Aside from wave propagation there are believed to be other normal vibrational mode effects. Some of these effects are believed to dominate in shallow water and others to dominate in deeper water. At the present time, however, the effects are incompletely understood and seismologists are not all agreed as to the relative importance of the various effects, or even as to the existence of some of them.

Regardless of the cause, it is well known that certain marine seismic records contain frequency components which are so obvious because of their intensity and duration throughout the record that they have caused the records themselves to be designated by the term "singing records." This singing energy may be in the form of a single dominant frequency component which is sometimes almost perfectly sinusoidal along the length of the record, or the singing energy may consist of a plurality of components of different frequencies. Usually the remarkable, almost purely sinusoidal, character of these records does not become fully evident until the seismic traces have been passed through a filter or filters having a pass band or pass bands spanning the inherent dominant frequency or frequencies. It so happens that the dominant frequency or frequencies often occur in the pass bands of conventional filters used in seismic recording.

This singing phenomenon is made more apparent where automatic gain control is used to maintain the amplitude of the recorded seismic detector traces within predetermined limits, since such gain control has the effect of tending to equalize the amplitudes of successive portions of the singing components, even though the actual amplitudes thereof normally decrease as a function of time after the seismic disturbance. In addition to having a dominant component or components, the singing records often exhibit a beat effect, in which the average amplitude of the detector trace oscillates about a mean value, the frequency of this beat usually being some submultiple of the frequency or frequencies of the singing components.

In a copending application of Wayne W. Grannemann, Serial No. 511,887, there is disclosed methods and apparatus for eliminating a single dominant frequency component from a seismic detector trace in which an auxiliary trace is produced having a frequency and amplitude substantially identical to that of the undesired component. More particularly, in the above Grannemann application, the seismic detector trace is passed through a losser network which equalizes the amplitude of the trace except for abrupt variations of short duration, corresponding to reflections or other events of interest. The output from the losser network is supplied to a clipping network which produces a square wave signal having a constant amplitude and a frequency determined by the frequency of the seismic detector trace itself. This square wave signal is then passed through a filter which eliminates harmonics to produce a substantially sinusoidal wave of constant amplitude having a frequency determined by the frequency of the seismic detector trace. This substantially sinusoidal auxiliary signal is then subtracted from the losser output signal to cancel the undesired component from the seismic detector trace without substantially affecting the reflection therein. An additional feature of the above Grannemann application relates to the differentiation of the seismic detector trace prior to passage through the losser network to increase or otherwise emphasize the amplitude of signal portions which appear as phase variations in the original seismic detector trace.

The invention disclosed and claimed in the above-mentioned Grannemann application is very useful in treating seismic records in which the singing energy is present to a large extent in a single dominant frequency. However, it is not as well adapted to handle records in which the singing energy is present in a number of components of different frequency. Broadly, the present invention contemplates methods and apparatus for analyzing seismic detector traces to remove undesired components of different frequencies, in which the detector trace is passed in parallel through a plurality of "notch" or narrow pass band filters having pass bands corresponding to the different frequencies or frequency ranges of the singing energy present in the record. Each of the output signals from the notch filters is supplied to an associated variable losser network which acts as a type of automatic gain control network to control the amplitude of the signal passing therethrough. The time constant of the losser network is such that individual oscillations in the trace, corresponding to the signal portions therein, pass through the losser network without any substantial change in amplitude, whereas amplitude changes of longer duration, such as the beat effect mentioned above, are eliminated by the constant amplitude action of the losser network. The output of the losser network thus comprises a wave train of substantially constant amplitude with portions of increased amplitude interspersed therein.

The output of each of the losser networks is then supplied to an associated circuit containing a pair of parallel branches. One of such branches includes a clipping network which converts the losser output signal into a constant amplitude square wave having axis crossing points corresponding to the axis crossing points of the losser output signal. The square wave signal from the clipping network is passed through a smoothing filter to eliminate harmonics to produce a substantially sinusoidal, constant amplitude signal having a frequency determined by the frequency of the input square wave.

signal. The clipping network and smoothing filter thus remove the signal portion from the signal passing through these elements. The output signal from the smoothing filter is inverted in phase and supplied as one input to an adding network. The other input to the adding network is supplied from the other of the parallel branches connected to the output of the losser network. Thus, the constant amplitude signal from the clipping and smoothing filter is effectively subtracted from the signal from the losser network, this latter signal being substantially identical to the former except for the superposition of the signal or reflection portions. Subtraction of the two signals, therefore, produces a resultant signal which corresponds to the signal portion itself, with substantially all of the singing energy removed.

In additional forms of the present invention, the seismic detector trace may be differentiated prior to passage through the different losser networks to emphasize reflections which appear in the original trace as phase variations. As a further improvement in the present invention, the phase and amplitude of the auxiliary signal in the clipper and filter branch network may be automatically regulated in response to the phase and amplitude of the signal in the other parallel branch to provide a more exact cancellation of the singing energy.

Figure 2:
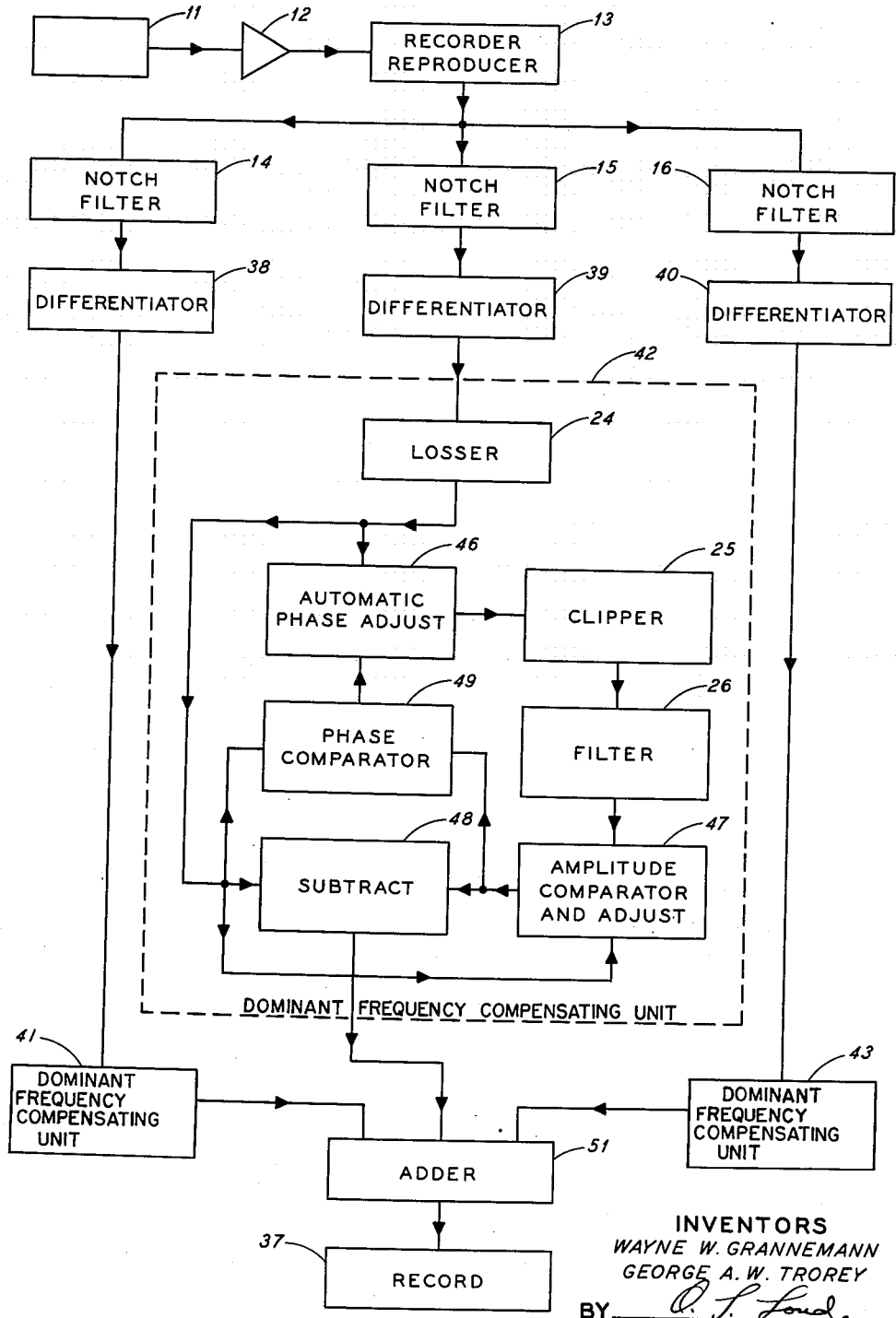

The objects and advantages of the present invention will be further apparent from the following description when read in connection with the accompanying drawing, in which:

Fig. 1 diagrammatically illustrates one embodiment of the present invention; and Fig. 2 diagrammatically illustrates an alternate embodiment of the present invention utilizing differentiation of the original seismic trace and automatic phase and amplitude regulation in the generation of the auxiliary signal.

Referring to Fig. 1 by character of reference, numeral 11 designates a seismic wave detector for producing a seismic trace having an amplitude corresponding to the movement of the earth in response to a seismic disturbance. As mentioned above, the present invention is particularly adapted for use in marine prospecting work, where the singing record phenomenon is usually encountered, but it will be understood that this invention is applicable to seismic surveying wherever the singing record phenomenon is a problem. The output from detector 11 is supplied through an amplifier 12 to a suitable reproducible recording device generally designated as 13. Recording device 13 may be of any suitable known type, such as a photographic or magnetic medium, on which the seismic detector traces may be recorded and reproduced repeatedly and at will. Although only one seismic detector and its associated amplifying channel have been illustrated, it will be obvious to those skilled in the art that, in practice, a large number of such detectors are normally utilized for each seismic disturbance and that such detectors may be arranged in any suitable configuration.

Assuming that the seismic detector trace recorded on recorder 13 is of the singing record type described above, in which the signal portion, representing the energy reflected from various subsurface interfaces, is superposed on a noise portion including a plurality of substantially sinusoidal components, the operation of the present invention to remove the undesired components is as follows:

The trace is reproduced from recorder 13 and supplied in parallel to a plurality of "notch" or narrow band pass filters 14, 15, and 16. Although only three such filters are illustrated, it will be obvious to those skilled in the art that the number of such filters utilized may be varied to accommodate the number of different frequency components which comprise the singing energy. The outputs from notch filters 14, 15, and 16 are each supplied to respective dominant frequency cancellation networks, and since such cancellation networks are substantially identical, only the cancellation network for filter 15 is shown in detail. This cancellation network comprises the elements within the dotted enclosure of Fig. 1 and is identified by reference character 18. Identical dominant frequency cancellation (DFC) networks 17 and 19 are diagrammatically illustrated for filters 14 and 16, respectively.

The output from filter 15 is supplied to a looser network 24 which adjusts the amplitude of the trace within predetermined limits. As mentioned above, many singing records exhibit a characteristic beat effect having a frequency which is some submultiple of the predominant frequency component of the trace, and network 24 acts as a type of automatic gain control to smooth out this beat frequency, if present. The time constant of network 24 is so chosen as not to appreciably affect the amplitude of the individual oscillations or reflections present in the trace, so that these individual oscillations pass through network 24 substantially unchanged. Network 24 may be of any suitable known type for controlling the amplitude of a signal, such as a well-known diode losser network which acts to maintain a voltage within predetermined amplitude limits.

In a representative type of singing record, the output of losser 24 would comprise a substantially sinusoidal wave train having a frequency lying within the pass band of filter 15 and having the reflections of interest superposed on the sinusoidal component either as variations in amplitude or phase. As mentioned above, the time constant of looser 24 is so chosen as to pass amplitude variations in the individual cycles of the wave train, thus insuring that reflections of interest superposed on the sinusoidal wave train will appear at the output of losser network 24.

The output from losser network 24 is then supplied in common to a pair of parallel branch networks. One branch of this network comprises a clipper 25 having an output connected to a filter network 26 whose output in turn is connected to an amplifier and phase inverter network 27. The output of amplifier 27 is supplied to an adder network 28. Clipper 25 acts to produce a constant amplitude square wave whose axis crossing points or frequency correspond to the axis crossing points or frequency of the signal from losser 24. This square wave of constant amplitude from clipper 25 is supplied to filter 26 which removes the harmonics from the square wave and produces a sine wave having a constant amplitude and a frequency determined by the frequency of the signal from losser 24. This sinusoidal signal is supplied to network 27 where it is amplified, inverted in phase and then supplied as one input to adder network 28.

The other branch of the parallel network comprises a phase correction circuit 31 which serves to vary the phase of the signal passing therethrough in accordance with the phase changes which are introduced into the other branch signal in passing through clipper network 25. Phase correction network 31 may thus be a simple filter network having the same phase transmission characteristics as clipper 25. The output from phase correction network 31 is supplied to a filter 32 which is substantially identical to filter 26. The output from filter 32 is supplied through an amplifier 33 to another input of adder network 28. Network 28 serves to add the two signals supplied thereto, and since the signal supplied from network 27 has been inverted in phase, the predominant frequency components are thus subtracted from each other in network 28 to produce effective cancellation of the singing component.

The action described above for cancellation network 18 is substantially duplicated in cancellation networks 17 and 19 on the respective signals supplied thereto by filters 14 and 16. The outputs of cancellation networks 17, 18, and 19 thus comprise the signal portions corresponding to the reflections of interest which lie within the frequency ranges encompassed by band pass filters 14, 15, and 16.

These output signals are supplied to a summation network 35 where they are added to produce a resultant signal representing that part of the signal portion which is present in the frequency range of filters 14, 15, and 16. The output of summation network 35 is supplied to a phase equalizing network 36 to remove any phase distortion produced during passage of the signals through the filters or other components of the system. The output of network 36 is supplied to a recorder 37 to produce a record of the resultant signal.

The embodiment of Fig. 1 is particularly well adapted for use where the reflections of interest are superposed on the singing energy as amplitude changes and may readily be detected after subtraction of the singing energy. As mentioned earlier, however, the reflections of interest may sometimes appear on the detector trace only as phase changes therein without any substantial effect on the amplitude of the trace. Such phase changes are difficult to detect, particularly where the total trace is substantially a sinusoidal wave train.

The embodiment illustrated in Fig. 2 may be utilized to convert these phase changes into amplitude changes prior to subtraction of the dominant frequency components from the trace. Additionally, the embodiment of Fig. 2 provides for automatic regulation of the amplitude and the phase of the auxiliary signal produced in the dominant frequency cancellation networks to produce more exact cancellation of the singing energy. In Fig. 2, seismic detector 11 produces an output signal which is supplied through amplifier 12 to recorder/reproducer 13, and the output from recorder/reproducer 13 is supplied in parallel to notch filters 14, 15, and 16, as before. The outputs from filters 14, 15, and 16 are supplied to a plurality of differentiating networks 38, 39, and 40 which serve to produce output signals proportional to the first derivative of the traces supplied thereto. Variations in the frequency of the input signals to differentiating networks 38, 39, and 40 are thus reflected as variations in the amplitudes of the differentiated output signals thereof. This increases the possibility of detecting the presence of reflections of interest in the resultant traces since, in general, a variation in amplitude is easier to detect than a variation in frequency, particularly in a wave train which is nearly sinusoidal over a relatively long duration.

The output from differentiator 39 is supplied to a dominant frequency elimination network which comprises the elements in the dotted enclosure 42. Similar dominant frequency elimination networks 41 and 43 are provided for differentiating networks 38 and 40, respectively. Network 42 includes a losser 24 which functions in a manner identical to that described in connection with losser 24 in Fig. 1. The output from losser 24 is supplied to a pair of parallel branch networks. One branch includes an automatic phase adjusting network 46 whose output signal is supplied to clipper 25. The output from clipper 25 is supplied through filter 26 to an automatic amplitude comparing and adjusting network 47. The output from comparator 47 is supplied as one input to a subtracting network 48. The other input to subtracting network 48 is supplied from losser 24.

A phase comparator network 49 receives one input signal corresponding to the output signal of amplitude comparator 47 and receives another input signal corresponding to the output signal from losser 24. Phase comparator 49 acts to compare the phases of these two input signals and supply a control signal to automatic phase adjusting network 46 to adjust the phase of the signal passing therethrough to match the phase of the signal supplied from losser 24. The time constant of networks 46 and 49 is such that they act on the average phase averaged over a suitable time interval. That is, they have a time constant such that they do not appreciably affect the signal portion and act only on the singing portion. Amplitude comparator network 47 compares the amplitude of the signal from the filter 26 with that of the signal from losser 24 and adjusts the amplitude of the signal from filter 26 to substantially equalize the amplitudes of the input signals to subtracting network 48. Amplitude comparator and adjusting network 47 has a time constant such that it does not appreciably affect the signal portion of the trace and acts only on the singing portion. The phase and amplitude of the signals in cancellation network 42 are thus automatically regulated during the operation so that the cancellation action of the network will be most effective. The output from subtracting network 48 is supplied to a summation network 51 which also receives the output signals from cancellation networks 41 and 43. These signals are combined in network 51 to produce a resultant signal which is supplied to recorder 37.

The embodiment illustrated in Fig. 2 has the advantage with respect to the embodiment of Fig. 1 that one output from losser 24 is supplied directly to one input of subtracting network 48 so that no phase distortion is introduced into this signal. The embodiment of Fig. 2 has the additional advantage that the use of automatic phase and amplitude regulation to a large extent eliminates the necessity for manual adjustment of these quantities, thus increasing the accuracy and the speed of operation of the system. The embodiment illustrated in Fig. 1, on the other hand, has the advantage that the output circuit from losser 24 is substantially perfectly balanced through both of the branch networks, thus reducing the possibility of assymetrical phase distortion in the two branches.

Although but a few embodiments of the present invention have been described, it will be apparent to those skilled in the art that various changes and modifications may be made therein without departing from the spirit and scope of the appended claims.

We claim:

1. The method of eliminating a plurality of different frequency components from a seismic detector trace comprising the step of filtering said trace in a plurality of filters, each of said filters having narrow pass bands that includes one of the frequencies of said plurality of different frequency components to produce a plurality of filtered signals of narrow frequency range, producing a plurality of auxiliary signals, each corresponding to one of said signals from said filters, each of said auxiliary signals having a substantially constant amplitude and having a frequency determined by the frequency of the corresponding one of said signals from said filters, inverting the phase of each of said auxiliary signals, adding each of said inverted auxiliary signals to the corresponding one of said signals from said filters to cancel the portion of each of said signals from said filters corresponding to said auxiliary signals, and then combining a plurality of the added signals to generate a seismic trace from which said different frequency components have been eliminated.

2. The method of eliminating a plurality of different frequency components from a seismic detector trace comprising the steps of filtering said trace in a plurality of filters, each of said filters having narrow pass bands that includes one of the frequencies of said plurality of different frequency components to produce a plurality of filtered signals of narrow frequency range, passing each of said filtered signals through one of a corresponding plurality of networks, each of which substantially equalizes the amplitude of said corresponding filtered signal except for portions of relatively abruptly increasing amplitude, producing a plurality of auxiliary signals, each corresponding to one of said signals from one of said networks, each of said auxiliary signals having a constant amplitude and having a frequency determined by the frequency of the corresponding one of said signals from said network, inverting the phase of each of said auxiliary signals, and adding each of said inverted auxiliary signals to said corresponding one of said signals from said network to cancel the portion of each of said signals from said networks corresponding to said auxiliary signals, whereby only said portions of said network signals of relatively abruptly increasing amplitude remain, and then combining said remaining portions to generate a seismic trace from which said different frequency components have been eliminated.

3. The method of eliminating a plurality of dominant frequency components of a seismic detector trace comprising the steps of filtering said trace in a plurality of filters, each of said filters having narrow pass bands that includes one of said plurality of dominant frequencies to produce a plurality of filtered signals of narrow frequency range, producing a square wave signal corresponding to each of said filtered signals, each of said square wave signals having axis crossing points corresponding to the frequency of the corresponding one of said filtered signals, filtering each of said square wave signals to produce a plurality of substantially sinusoidal signals, each having constant amplitudes and having frequencies corresponding to one of the ranges of frequencies of said filtered signals, inverting the phase of each of said sinusoidal signals, adding each of said inverted sinusoidal signals to the corresponding one of said filtered signals to cancel the portion of each of said filtered signals corresponding to said sinusoidal signals, and then combining a plurality of the resultant added signals to generate a seismic trace from which said dominant frequency components have been eliminated.

4. The method of eliminating a plurality of dominant frequency components from a seismic detector trace comprising the steps of filtering said trace in a plurality of narrow pass band filters, the band pass of each of said filters being adjusted to include one of said plurality of dominant frequencies to produce a plurality of filtered signals of narrow frequency range, passing each of said filtered signals through a network which is adjusted substantially to equalize the amplitudes of one of said filtered signals except for portions of relatively abruptly increasing amplitude, producing a square wave signal corresponding to each of said signals from said networks, each of said square wave signals having a frequency corresponding to the frequency of the corresponding signal from said network, filtering each of said square wave signals to produce a plurality of substantially sinusoidal signals having a constant amplitude and a frequency corresponding to the frequency of said square wave signals, combining each of said sinusoidal signals with the corresponding one of said signals from said networks to cancel the portion of each of said signals from said networks corresponding to said sinusoidal signals, whereby only said portions of set network signals of relatively abruptly increasing amplitude remain and then adding said remaining portions to generate a seismic trace from which said dominant frequency components have been eliminated.

5. The method of eliminating a plurality of dominant frequency components from a seismic detector trace comprising the steps of simultaneously converting said trace into a plurality of different frequency bands by passing said trace through a plurality of narrow pass band filters, the band pass of each of said filters being adjusted to include one of said plurality of dominant frequencies to produce a plurality of filtered signals of different narrow frequency ranges, passing each of said filtered signals through a network adjusted substantially to equalize the amplitudes of one of said filtered signals except for portions of relatively abruptly increasing amplitude, producing a square wave signal corresponding to each of said signals from said network, each of said square wave signals having a frequency corresponding to the frequency of the corresponding signal from said network, filtering each of said square wave signals to produce a plurality of substantially sinusoidal signals having a constant amplitude and a frequency corresponding to the frequency of said square wave signals, inverting the phase of each of said square wave signals, adding each of said inverted sinusoidal signals to the corresponding one of said signals from said networks to cancel the portion of each of said network signals corresponding to said sinusoidal signals, whereby only said portions of said network signals of relatively abruptly increasing amplitude remain, and adding together all of said remaining portions to produce a resultant signal from which said dominant frequency components have been eliminated.

6. The method of eliminating a plurality of different frequency components from a seismic detector trace comprising the steps of simultaneously filtering said trace by multiply passing said trace through at least one filter having a narrow pass band so that each of said passes includes one of said plurality of different frequencies to produce a plurality of filtered signals of different frequency ranges, differentiating each of said filtered signals to produce a plurality of differentiated signals, passing each of said differentiated signals through a network adjusted substantially to equalize the amplitudes of one of said differentiated signals except for portions of relatively abruptly increasing amplitude, producing a plurality of auxiliary signals corresponding to said signals from said network, each of said auxiliary signals having a substantially constant amplitude and having a frequency determined by the frequency of the corresponding one of said signals from said network, inverting the phase of each of said auxiliary signals, adding each of said auxiliary signals to its corresponding signal from said network to cancel the portion of each of said network signals corresponding to said auxiliary signals, whereby only said portions of said network signals of relatively abruptly increasing amplitude remain, and adding together all of said remaining portions to produce a seismic trace from which said plurality of different frequency components have been eliminated.

7. The method of eliminating a plurality of different frequency components from a seismic detector trace comprising the steps of filtering said trace by multiply passing said trace through at least one filter having a narrow pass band so that each of said passes includes one of said plurality of different frequencies to produce a plurality of filtered signals of different frequency ranges, passing each of said filtered signals through a network adjusted substantially to equalize the amplitudes of one of said filtered signals except for portions of relatively abruptly increasing amplitude, producing a plurality of auxiliary signals corresponding to said signals from said network, each of said auxiliary signals having a substantially constant amplitude and having a frequency determined by the frequency of the corresponding one of said signals from said network, combining each of said auxiliary signals with its corresponding signal from said network to cancel the portion of each of said network signals corresponding to said auxiliary signals, whereby only said portions of said network signals of relatively abruptly increasing amplitude remain, and adding together all of said remaining portions to produce a seismic trace from which said plurality of different frequency components have been eliminated.

8. The method of eliminating a plurality of dominant frequency components of a seismic detector trace comprising the steps of simultaneously filtering said trace in a plurality of narrow pass band filters, the band pass of each of said filters being adjusted to include one of said plurality of dominant frequencies to produce a plurality of filtered signals of narrow frequency range, passing each of said filtered signals through a network which is adjusted substantially to equalize the amplitudes of one of said filtered signals except for portions of relatively abruptly increasing amplitude, producing a square wave signal corresponding to each of said signals from said networks, each of said square wave signals having a frequency corresponding to the frequency of the corresponding signal from said network, filtering each of said square wave signals to produce a plurality of substantially sinusoidal signals having a constant amplitude and a frequency corresponding to the frequency of said square wave signals, automatically regulating the phase and the amplitude of each of said sinusoidal signals to maintain said phase and said amplitude substantially identical to the phase and the amplitude of said signals from said network, combining each of said sinusoidal signals with the corresponding one of said signals from said networks to cancel the portion of each of said network signals corresponding to said sinusoidal signals, whereby only said portions of said network signals of relatively abruptly increasing amplitude remain, and then adding said remaining portions to generate a seismic trace from which said dominant frequency components have been eliminated.

9. Apparatus for eliminating a plurality of dominant frequency components from a seismic detector trace comprising a plurality of filter networks, each of said networks having different narrow pass bands for filtering a plurality of selected frequencies in said trace, a plurality of losser networks, each of said losser networks being connected to one of said filter networks for substantially equalizing the amplitude of each of the signals from the corresponding one of said filter networks, except for portions of said signals of relatively abruptly increasing amplitude, means connected to the output of each of said losser networks for producing an auxiliary signal having a substantially constant amplitude and having a frequency determined by the frequency of the output signal of the corresponding one of said losser networks, means for subtracting each of said auxiliary signals from the corresponding one of said losser output signals, whereby only said portions of said signals of relatively abruptly increasing amplitude remain, and means for combining a plurality of said signal portions as a representation of said seismic trace with said dominant frequency components eliminated therefrom.

10. Apparatus for eliminating a plurality of dominant frequency components from a seismic detector trace comprising a plurality of filter networks, each of said networks having different narrow pass bands for filtering a plurality of selected frequencies in said trace, a plurality of differentiating networks, each of said differentiating networks being connected to one of said filter networks for differentiating the signal from said one of each filter networks, a plurality of losser networks, each of said losser networks being connected to one of said differentiating networks for substantially equalizing the amplitude of each of the signals from the corresponding one of said differentiating networks, except for portions of said signals of relatively abruptly increasing amplitude, means connected to the output of each of said losser networks for producing an auxiliary signal having a substantially constant amplitude and having a frequency determined by the frequency of the output signal of the corresponding one of said losser networks, means for subtracting each of said auxiliary signals from the corresponding one of said losser output signals, whereby only said portions of said signals of relatively abruptly increasing amplitude remain and means for combining a plurality of said signal portions as a representation of said seismic trace with said dominant frequency components eliminated therefrom.

11. Apparatus for eliminating a plurality of dominant frequency components from a seismic detector trace comprising a plurality of first filter networks, each of said networks having different narrow pass bands for filtering a plurality of selected frequencies including at least said dominant frequencies in said trace, a plurality of losser networks, each of said losser networks being connected to each of said filter networks for substantially equalizing the amplitude of each of the signals from the corresponding one of said filter networks, except for portions of said signals of relatively abruptly increasing amplitude, a plurality of clipping networks, each of said clipping networks being connected to the output of one of said losser networks for producing a plurality of square wave signals having constant amplitudes and having frequencies determined by the frequencies of said losser output signals, a plurality of second filter networks, each of said second filter networks being connected to the output of one of said clipping networks for filtering said square wave signals to produce a plurality of auxiliary signals having substantially constant amplitudes and having frequencies determined by the frequencies of the corresponding output signals of said losser networks, means for subtracting each of said auxiliary signals from the corresponding one of said losser output signals, whereby only said portions of said losser output signals of relatively abruptly increasing amplitude remain, and means for combining said remaining portions to produce a resultant signal as a representation of said seismic detector trace with said dominant frequency components eliminated therefrom.

References Cited in the file of this patent

UNITED STATES PATENTS

| | | |
|---|---|---|
| 2,304,740 | Minton | Dec. 8, 1940 |
| 2,578,133 | Hawkins | Dec. 11, 1951 |
| 2,620,890 | Lee | Dec. 9, 1952 |
| 2,725,534 | Hemphill | Nov. 29, 1955 |
| 2,733,412 | Alexander | Jan. 31, 1956 |
| 2,791,751 | Fine | May 7, 1957 |